United States Patent
Brookshire et al.

(10) Patent No.: US 11,263,443 B2
(45) Date of Patent: Mar. 1, 2022

(54) CENTIMETER HUMAN SKELETON POSE ESTIMATION

(71) Applicant: SRI International, Menlo Park, CA (US)

(72) Inventors: Jonathan D. Brookshire, Princeton, NJ (US); Supun Samarasekera, Skillman, NJ (US); Kshitij Singh Minhas, Watchung, NJ (US)

(73) Assignee: SRI International, Menlo Park, CA (US)

( * ) Notice: Subject to any disclaimer, the term of this patent is extended or adjusted under 35 U.S.C. 154(b) by 104 days.

(21) Appl. No.: 16/868,870

(22) Filed: May 7, 2020

(65) Prior Publication Data
US 2021/0019507 A1     Jan. 21, 2021

Related U.S. Application Data

(60) Provisional application No. 62/876,193, filed on Jul. 19, 2019.

(51) Int. Cl.
*G06K 9/00*      (2006.01)
*G06T 7/30*      (2017.01)
(Continued)

(52) U.S. Cl.
CPC ..... *G06K 9/00348* (2013.01); *G06K 9/00369* (2013.01); *G06N 20/00* (2019.01); *G06T 7/30* (2017.01); *G06T 7/74* (2017.01); *G06T 17/20* (2013.01); *G06T 2207/10012* (2013.01); *G06T 2207/10028* (2013.01); *G06T 2207/10048* (2013.01); *G06T 2207/20084* (2013.01); *G06T 2207/30196* (2013.01); *G06T 2210/12* (2013.01)

(58) Field of Classification Search
CPC .......... G06K 9/00348; G06K 9/00369; G06K 9/00201; G06K 9/2036; G06K 9/6292; G06K 9/6271; G06T 7/30; G06T 7/74; G06T 17/20; G06T 2210/12; G06T 2207/30196; G06T 2207/20084; G06T 2207/10028; G06T 2207/10048; G06T 2207/10012; G06T 2207/10021; G06T 7/75; G06T 2210/56; G06T 19/00; G06N 20/00; G06N 3/0454
USPC ....................................................... 382/103
See application file for complete search history.

(56) References Cited

U.S. PATENT DOCUMENTS

| 2010/0238168 | A1* | 9/2010 | Kim | ......................... G06T 17/00 345/420 |
| 2018/0024641 | A1* | 1/2018 | Mao | ..................... G06K 9/00389 382/103 |

* cited by examiner

*Primary Examiner* — Stephen P Coleman
(74) *Attorney, Agent, or Firm* — Moser Taboada

(57) ABSTRACT

A method, apparatus and system for human skeleton pose estimation includes synchronously capturing images of a human moving through an area from a plurality of different points of view, for each of the plurality of captured images, determining a bounding box that bounds the human in the captured image and identifying pixel locations of the bounding box in the image, for each of the plurality of captured images, determining 2D and single-view 3D skeletons from the pixel locations of the bounding box, determining a first, multi-view 3D skeleton using a combination of the 2D and single-view 3D skeletons, and optimizing the first, multi-view 3D skeleton to determine a final 3D skeleton pose for the human. The method, apparatus and system can further include illuminating the area with structured light during the capturing of the images of the human moving through the area.

20 Claims, 15 Drawing Sheets

(51) Int. Cl.
*G06T 7/73* (2017.01)
*G06T 17/20* (2006.01)
*G06N 20/00* (2019.01)

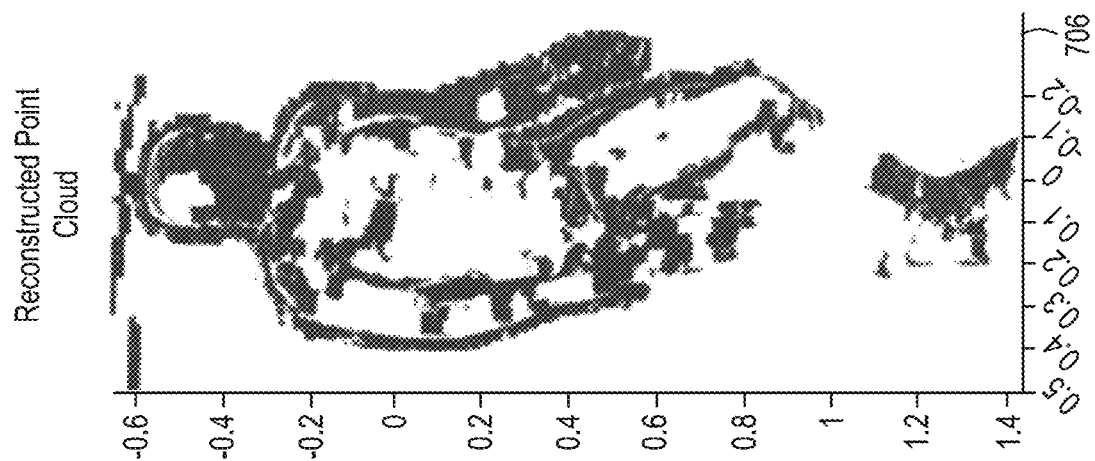
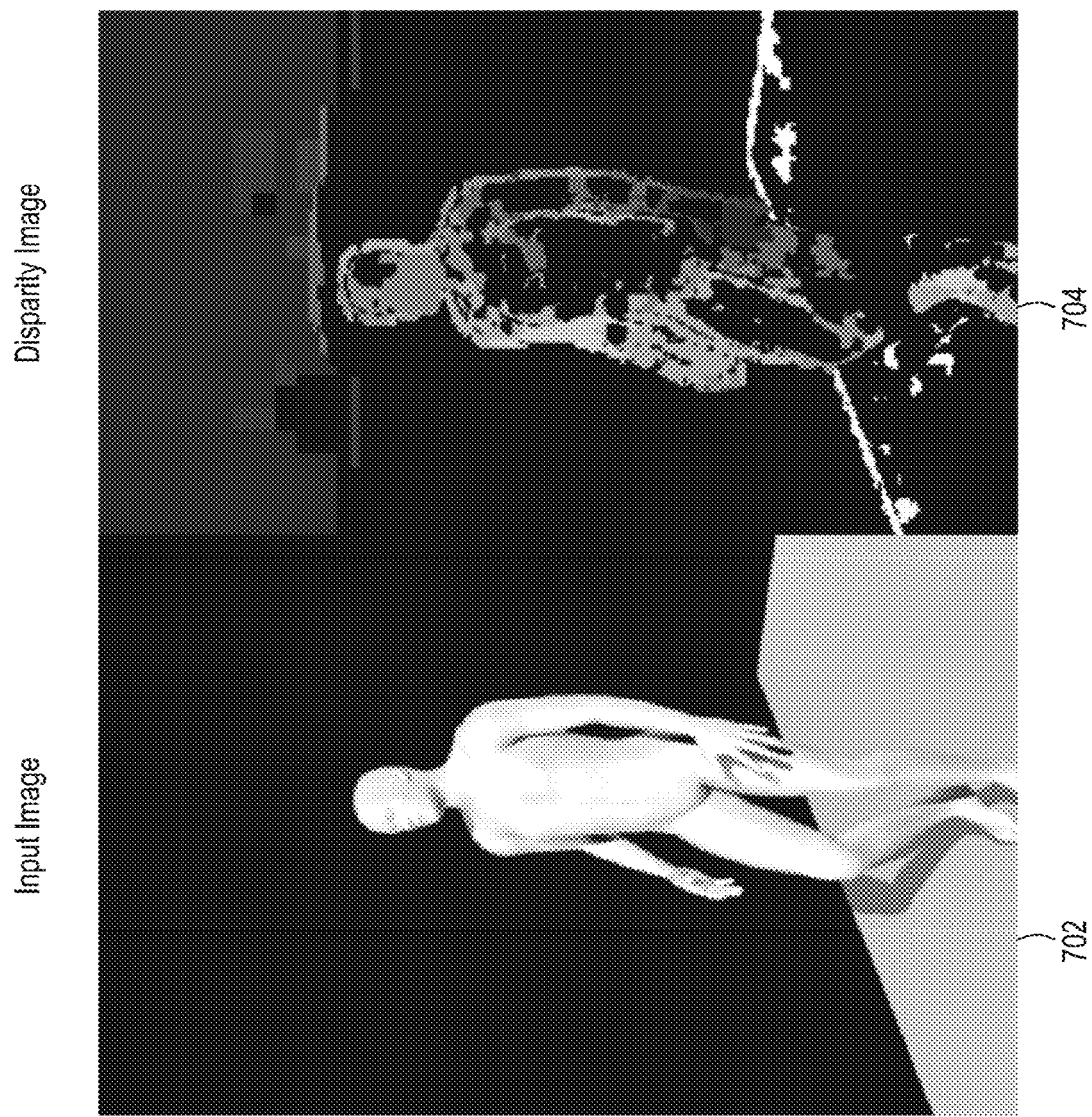
FIG. 7A

| Description | Example Pattern | Percent Increase in Skeleton Error |
|---|---|---|
| No Pattern | None | 0.0% |
| Large Black Circles | | 2.9% |
| Large White Circles | | 16.8% |
| Black Rings | | 11.8% |
| White Rings | | 0.7% |
| Small Black Rings | | 3.9% |
| Small White Rings | | 27.6% |

FIG. 8

| | Subject #1, Structured Light, White Rings (hs7_004) | Subject #1, Structured Light, White Rings (hs7_003) | Subject #1, Structured Light, White Rings (hs6_012) | Subject #1, No Structured Light (hs7_001) | Subject #2, Structured Light, Black Rings (hs6_014) | Subject #1, No Structured Light (hs6_015) |
|---|---|---|---|---|---|---|
| Rt. Ankle | 0.0175 | 0.0179 | 0.0206 | 0.0205 | 0.0185 | 0.0218 |
| Rt. Knee | 0.0124 | 0.0103 | 0.0132 | 0.0183 | 0.0155 | 0.0211 |
| Rt. Hip | 0.0246 | 0.0218 | 0.0232 | 0.0277 | 0.0336 | 0.0248 |
| Left Hip | 0.0252 | 0.0236 | 0.0305 | 0.0283 | 0.0368 | 0.03 |
| Left Knee | 0.0122 | 0.0117 | 0.0152 | 0.017 | 0.0142 | 0.0155 |
| Left Ankle | 0.0159 | 0.015 | 0.0243 | 0.0181 | 0.0197 | 0.0217 |
| Pelvis | 0.0079 | 0.0066 | 0.0097 | 0.0096 | 0.01 | 0.0093 |
| Rt. Shoulder | 0.0106 | 0.0068 | 0.0085 | 0.0095 | 0.0128 | 0.0089 |
| Rt. Elbow | 0.0133 | 0.0112 | 0.0139 | 0.0191 | 0.0143 | 0.0124 |
| Rt. Wrist | 0.0118 | 0.0101 | 0.0137 | 0.0162 | 0.0155 | 0.015 |
| Left Shoulder | 0.0078 | 0.0059 | 0.0092 | 0.0122 | 0.0123 | 0.009 |
| Left Elbow | 0.0138 | 0.011 | 0.0158 | 0.0219 | 0.0175 | 0.0165 |
| Left Wrist | 0.0105 | 0.0075 | 0.0129 | 0.018 | 0.0144 | 0.0137 |
| Neck | 0.0069 | 0.0046 | 0.007 | 0.0058 | 0.0082 | 0.008 |
| Head | 0.0086 | 0.0066 | 0.0102 | 0.0107 | 0.0098 | 0.0094 |
| | | | | | | |
| Lwr. Body Total | 0.0180 | 0.0167 | 0.0212 | 0.0217 | 0.0231 | 0.0225 |
| Upr. Body Total | 0.0101 | 0.0078 | 0.0112 | 0.0137 | 0.0128 | 0.0114 |
| Whole Body Total | 0.0133 | 0.0114 | 0.0152 | 0.0169 | 0.0169 | 0.0158 |

FIG. 10

CENTIMETER HUMAN SKELETON POSE ESTIMATION

CROSS-REFERENCE TO RELATED APPLICATIONS

This application claims benefit of and priority to U.S. Provisional Patent Application Ser. No. 62/876,193, filed Jul. 19, 2019, which is herein incorporated by reference in its entirety.

GOVERNMENT RIGHTS

This invention was made with Government support under Contract DE-AC05-76RL01830 awarded by the United States Department of Energy. The Government has certain rights in the invention.

FIELD

Embodiments of the present principles generally relate to the estimation of a pose of a human skeleton, and more particularly, to methods, apparatuses, and systems for estimating the pose of a human skeleton to sub-centimeter accuracy.

BACKGROUND

Many applications in computer vision involve motion analysis and modeling, such as motion tracking and action recognition. Most conventional methods for motion modeling are largely limited to simple motions. A comprehensive analytical model for complex motions, such as biological motion or human motion, is a challenging problem.

One of the difficulties in motion modeling stems from the high dimensionality of the complex motion, which demands great descriptive power from the model itself. Without any constraint, it is very difficult, if not impossible, to model arbitrary motions. Fortunately, in practice, the motions of interest are more or less constrained due to physical or biological reasons. Although these constraints can be highly nonlinear, they largely reduce the intrinsic complexity of the motion. For example, human motions cannot be arbitrary but must be confined by anthropologically feasible joint angles, e.g., the upper arm and the lower arm cannot move independently.

In many applications, for human motions, there is a need to estimate the pose of a human's skeleton to sub-centimeter accuracy.

SUMMARY

Embodiments of methods, apparatuses and systems for estimating the pose of a human's skeleton to sub-centimeter accuracy are disclosed herein.

In some embodiments in accordance with the present principles, a method for human skeleton pose estimation includes synchronously capturing images of a human moving through an area from a plurality of different points of view, for each of the plurality of captured images, determining a bounding box that bounds the human in the captured image and identifying pixel locations of the bounding box in the image, for each of the plurality of captured images, determining at least one of a 2D skeleton and a single-view 3D skeleton from the identified pixel locations of the bounding box, determining a first, multi-view 3D skeleton using a combination of the at least one of the 2D skeleton and the single view 3D skeleton determined for each of the plurality of captured images, and optimizing the first, multi-view 3D skeleton to determine a final 3D skeleton pose estimation for the human by applying visibility reasoning techniques to at least some of the 2D skeletons and the single-view 3D skeletons determined for the plurality of captured images.

In some embodiments, the method can further include capturing the images of the human moving through the area during an illumination of the area with structured light to enable the capture of additional texture in the images.

In some embodiments, the method can further include determining a gait of the human moving through the area and using the gait information to fill-in missing data of occluded portions of the human in the captured images.

In some embodiments, the method can further include using at least one of information and data from the plurality of images captured from the different points of view to fill-in information or data missing for any one of the images captured from the different points of view.

In some embodiments, in the method joint locations for the first, multi-view 3D skeleton are determined from maximum pixel locations of joints of the 2D skeletons and the single-view 3D skeletons and known locations of image capture devices at the different points of view.

In some embodiments, in the method the first, multi-view 3D skeleton is optimized by optimizing a position of each joint of the first, multi-view 3D skeleton by maximizing a likelihood from neural network detections used to determine the at least one of the 2D skeletons and the single-view 3D skeletons and keeping bone lengths of the first, multi-view 3D skeleton fixed.

In some embodiments, the method can further include capturing at least some of the images from the plurality of different points of view as stereo image pairs, generating a 3D point cloud from data related to the stereo image pairs, and optimizing the first, multi-view 3D skeleton by aligning at least one of a determined skinned multi-person linear mesh and a determined skinned multi-person linear skeleton against the 3D point cloud.

In some embodiments, the method can further include determining the first, multi-view 3D skeleton using singular value decomposition and flipping left and right associations for a minority of the plurality of captured images when performing the singular value decomposition to determine the first, multi-view 3D skeleton.

In some embodiments, the method can further include capturing at least one of thermal images and infrared images of the human to assist in determining a human skeleton through clothing In some embodiments in accordance with the present principles, an apparatus for human skeleton pose estimation includes a bounding box detection module to, for each of a plurality of images of a human moving through an area synchronously captured from a plurality of different points of view, determine a bounding box that bounds the human in the captured image and identify pixel locations of the bounding box in the image, an image-based skeleton extraction module to, for each of the plurality of captured images, determine at least one of a 2D skeleton and a single-view 3D skeleton from the identified pixel locations of the bounding box, a multi-view fusion module to determine a first, multi-view 3D skeleton using a combination of the at least one of the 2D skeletons and the single-view 3D skeletons determined for each of the plurality of the captured images, and at least one of a skeleton fitting module and a skeleton conversion module to optimize the first, multi-view 3D skeleton to determine a final 3D skeleton pose estimation for the human by applying visibility reasoning techniques to at least some of the 2D skeletons and the single-view 3D skeletons determined for the plurality of captured images.

In some embodiments, in the apparatus the skeleton conversion module generates at least one of a skinned multi-person linear mesh and a skinned multi-person linear skeleton for optimizing the first, multi-view 3D skeleton.

In some embodiments, the apparatus can further include an image-based dense stereo module to generate a 3D point cloud from stereo data of the plurality of captured images and a 3D model fit module to optimize the first, multi-view 3D skeleton by aligning the at least one of the skinned multi-person linear mesh and the skinned multi-person linear skeleton against the 3D point cloud.

In some embodiments, the apparatus can further include at least one structured light emitter to illuminate the area with structured light during the capture of the images of the human moving through the area to provide visual features in the plurality of captured images for otherwise texture-less surfaces.

In some embodiments, a system for human skeleton pose estimation includes a plurality of cameras to synchronously capture images of a human moving through an area from a plurality of different points of view and an apparatus including a processor and a memory, coupled to the processor, the memory having stored therein at least one of programs or instructions executable by the processor. In such embodiments when the processor executes the programs or instructions, the system is configured to synchronously capture images of a human moving through an area from a plurality of different points of view, for each of the plurality of captured images, determine a bounding box that bounds the human in the captured image and identify pixel locations of the bounding box in the image, for each of the plurality of captured images, determine at least one of a 2D skeleton and a single-view 3D skeleton from the identified pixel locations of the bounding box, determine a first, multi-view 3D skeleton using a combination of the at least one of the 2D skeleton and the single view 3D skeleton determined for each of the plurality of captured images, and optimize the first, multi-view 3D skeleton to determine a final 3D skeleton pose estimation for the human by applying visibility reasoning techniques to at least some of the 2D skeletons and the single-view 3D skeletons determined for the plurality of captured images.

In some embodiments, the system includes at least one structured light emitter and the system is configured to illuminate the area with structured light during the capturing of the images of the human moving through the area.

In some embodiments, in the system the plurality of different points of view comprise at least two points of view and the area comprises an area of a stationary radar.

In some embodiments, in the system the plurality of images captured from different points of view are time-stamped.

In some embodiments, in the system at least one of the plurality of cameras comprises at least one of thermal and infrared capture capabilities.

In some embodiments, the system is configured to optimize the first, multi-view 3D skeleton by at least one of a) optimizing a position of each joint of the first, multi-view 3D skeleton by maximizing a likelihood from neural network detections used to determine the at least one of the 2D skeletons and the single-view 3D skeletons and keeping bone lengths of the first, multi-view 3D skeleton fixed, b) using a machine learning approach to produce a linear function mapping from angles of joints of a determined human skeleton to mesh vertices determined by the skeleton conversion module, and c) aligning the mesh vertices against a 3D point cloud generated by an image-based dense stereo module from data from image pairs captured by the plurality of cameras.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 7a depicts an input image, a disparity image, and a reconstructed point cloud of an image of a human illuminated by non-structured light captured by a camera of a human skeleton pose estimation system in accordance with an embodiment of the present principles.

FIG. 8 depicts a table of different structured light patterns that can be used to illuminate a human subject when capturing images using a camera of a human skeleton pose estimation system in accordance with an embodiment of the present principles.

FIG. 10 depicts a table of test results for human pose estimations of sixteen (16) joints of the bodies of each of two human subjects illuminated by different structured light patterns and captured by a human skeleton pose estimation system in accordance with an embodiment of the present principles.

Figure 1A:
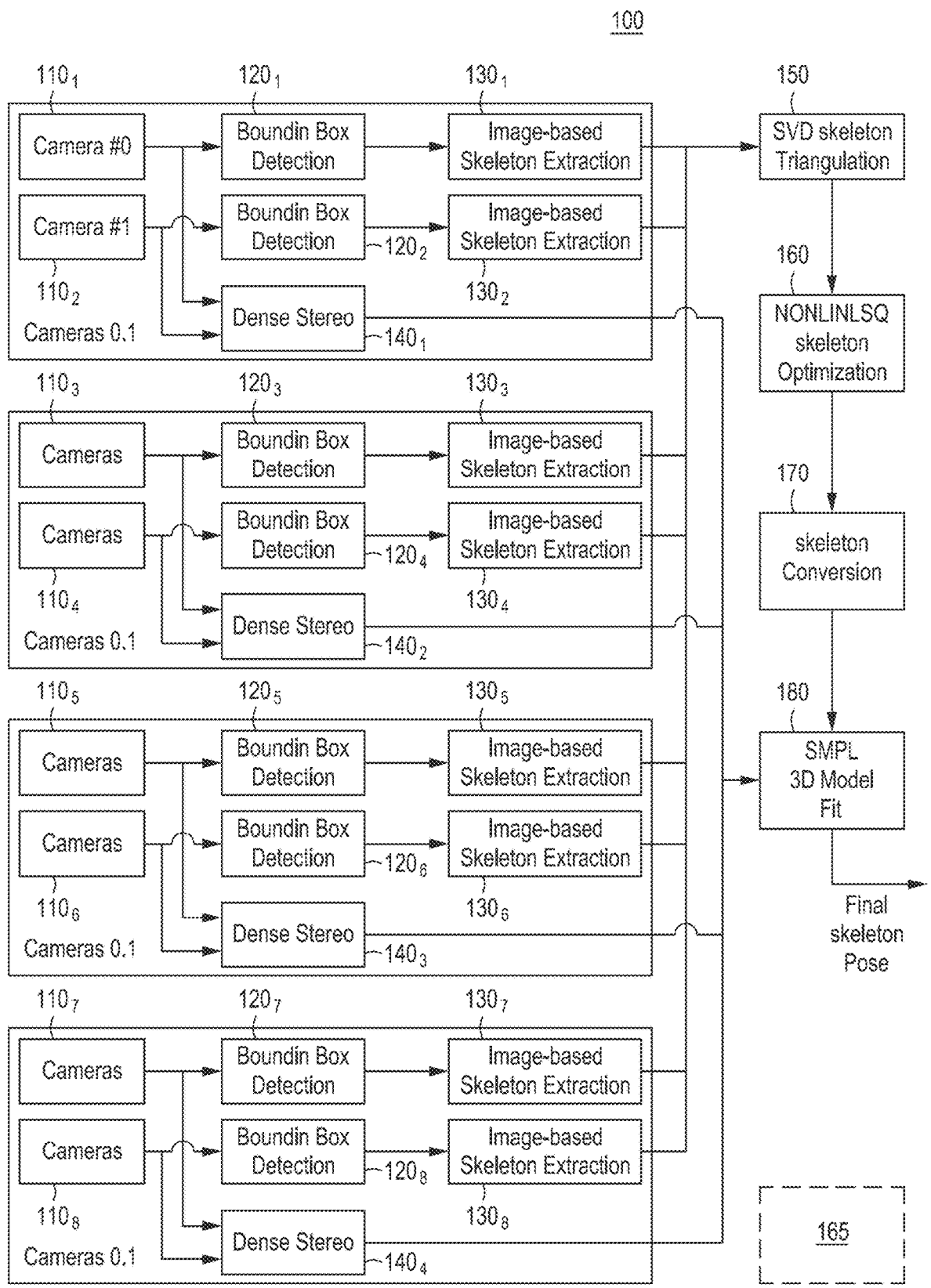
FIG. 1a depicts a high-level block diagram of a human skeleton pose estimation system 100 in accordance with a first embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relating to methods, apparatuses and systems for estimating the pose of a human's skeleton to sub-centimeter accuracy are disclosed herein. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to an airport scanning system including a specific number of cameras, such teachings should not be considered limiting. Embodiments in accordance with the present principles can be implemented in other systems requiring sub-centimeter accuracy of the pose of a human's skeleton determined using substantially any numbers of cameras within the concepts of the present principles.

Embodiments in accordance with the present principles provide methods, apparatuses and systems for estimating the pose of a human's skeleton to sub-centimeter accuracy. In some embodiments, a pose estimation system in accordance with the present principles estimates the pose of a human's skeleton to sub-centimeter accuracy while a subject is moving within a workspace. For example, in one embodiment a pose estimation system in accordance with the present principles is implemented to develop a "walk-through" scanner for airport security, in which a passenger does not need to stop and stand still and instead continues moving (e.g., at 2 m/s) while a scanner swings around the passenger in a workspace of, for example, 1.5 m×4 m. By accurately tracking the passenger's limbs and position ("pose") the radar reconstruction can be performed while the person is moving, which is advantageous over current scanning systems in which a passenger must stand still at the airport while a radar moves around the passenger. Embodiments of a pose estimation system in accordance with the present principles provide scanning systems which require less wait time at airports and a need for fewer airport scanning stations.

The inventors determined that to be able to provide a "walk-through" scanner for airport security a millimeter accuracy over a relatively large distance (e.g., 1-5 m) from the cameras would need to be achieved. Current state of the art algorithms in computer vision are capable of estimating human skeletons to about 5 cm-10 cm accuracy when a person maintains a relatively fixed distance from the camera. In accordance with some embodiments of the present principles, synchronized images are processed from multiple cameras, enabling the achievement of centimeter-level accuracy and the coverage of a larger workspace.

In some embodiments in accordance with the present principles, multiple cameras (e.g., eight cameras) are logically combined into stereo pairs (e.g., four stereo pairs). The images from each camera are first processed via Bounding Box Detection where the rectangular pixel coordinates of the subject person in the scene are extracted. An initial skeleton is then extracted which represents the joints (e.g., ankle, knee, hip, etc.) in 2D pixel coordinates. Alternatively or in addition, in some embodiments in which at least some 3D cameras are implemented, an initial skeleton can be extracted which represents the joints (e.g., ankle, knee, hip, etc,) in 3D pixel coordinates as well. All 2D and single-view 3D skeletons (e.g., eight) are then processed using a multi-view fusion technique, such as a singular value decomposition (SVD) skeleton extraction technique, producing a rough 3D initial multi-view estimation of the skeleton. The accuracy of the skeleton at this juncture is typically around 6 cm. A skeleton fitting technique, such as a nonlinear least squares (NONLINLSQ) skeleton optimization further reduces this error to around 3 cm. The skeleton is then converted to a skinned multi-person linear (SMPL) model representation via skeleton conversion. The SMPL model attaches a "flesh" mesh to the skeleton, allowing the skeleton to be further refined against 3D point cloud data from Dense Stereo reconstruction, reducing the average error to around 1 cm. The final output is the 3D position of each joint in the skeleton. The 3D position of each joint in the skeleton can then be provided for radar reconstruction.

FIG. 1a depicts a high-level functional block diagram of a human skeleton pose estimation system 100 in accordance with a first embodiment of the present principles. The human skeleton pose estimation system 100 of FIG. 1a illustratively comprises eight (8) cameras $110_1$-$110_8$ (collectively cameras 110), each of the cameras 110 having associated a respective bounding box detection module $120_1$-$120_8$ (collectively bounding box detection modules 120), and a respective image-based skeleton extraction module $130_1$-$130_8$ (collectively image-based skeleton extraction modules 130). In the embodiment of the human skeleton pose estimation system 100 of FIG. 1, the cameras 110 are arranged in pairs, illustratively camera pairs $110_1$-$110_2$, $110_3$-$110_4$, $110_5$-$110_6$, $110_7$-$110_8$. Each of the camera pairs comprises a dense stereo module $140_1$-$140_4$ (collectively image-based dense stereo modules 140). The human skeleton pose estimation system 100 of FIG. 1a further illustratively comprises a multi-view fusion module 150, a skeleton fitting module 160, a skeleton conversion module 170, a 3D model fit module 180 and at least one optional structured light emitter 165.

Although in the functional block diagram of the human skeleton pose estimation system 100 of FIG. 1a, each camera 110 is depicted as comprising a respective bounding box detection module 120 and a respective image-based skeleton extraction module 130 and each camera pair is depicted as comprising a respective dense stereo module 140, the illustrative embodiment of FIG. 1a should not be considered limiting. In some embodiments of a human skeleton pose estimation system in accordance with the present principles, each camera unit can include the ability to capture images and the functionality of some or all of the modules (e.g., the bounding box detection module 120, the image-based skeleton extraction module 130, the dense stereo module 140, the multi-view fusion module 150, the skeleton fitting module 160, the skeleton conversion module 170 and the 3D model fit module 180, as described below) for any or all of the camera units, in any combinations.

Figure 1B:
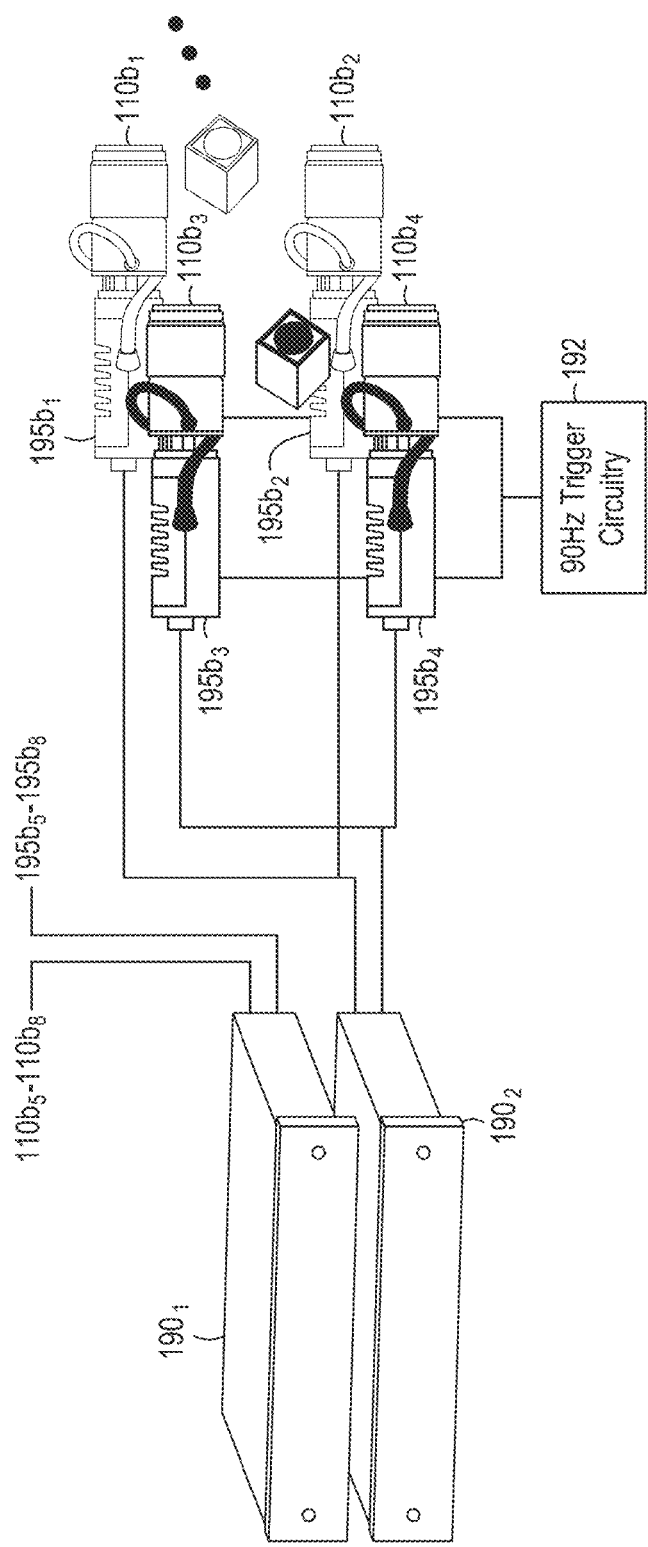
FIG. 1b depicts a high-level block diagram of a human skeleton pose estimation system in accordance with a second embodiment of the present principles.

Alternatively, in some embodiments, each camera of a human skeleton pose estimation system in accordance with the present principles can include the ability to capture images and the functionality of some or all of the modules (e.g., the bounding box detection module 120, the image-based skeleton extraction module 130, the dense stereo module 140, the skeleton fitting module 160, the skeleton conversion module 170 and the 3D model fit module 180, as described below) can be provided by one or more computing devices (e.g., servers). For example, FIG. 1b depicts a high-level block diagram of a human skeleton pose estimation system 100b in accordance with a second embodiment of the present principles. The human skeleton pose estimation system 100b of FIG. 1b illustratively comprises eight (8) cameras $110b_1$-$110b_8$ (collectively cameras 110b) in communication with two (2) computing units (servers) $190_1$-$190_2$. In the embodiment of the human skeleton pose estimation system 100b of FIG. 1b, the computing units $190_1$-$190_2$ provide the functionality of the modules (e.g., the bounding box detection module 120, the image-based skeleton extraction module 130, the dense stereo module 140, the skeleton fitting module 160, the skeleton conversion module 170 and the 3D model fit module 180) illustrated in the human skeleton pose estimation system 100 of FIG. 1a. In the human skeleton pose estimation system 100b of FIG. 1b, each of the cameras 110b illustratively comprises an optional respective structured light emitter $195b_1$-$195b_8$ (collectively light emitters 195 and described in greater detail below). As depicted in FIG. 1b, the cameras 110 can further include 90 Hz trigger circuitry 192 for synchronizing the cameras 110.

For example, in some embodiments a human skeleton pose estimation system of the present principles can include eight FLIR GS3-U3-89S6C-C cameras capable of 1080× 2048 resolution at 90 Hz. The cameras can further have attached 12 mm KOWA LM12SC lenses. The 90 Hz trigger from the cameras can be synchronized via a distributed RS422 clock network. In some embodiments of the human skeleton pose estimation system 100b of FIG. 1b, four cameras can connect to each of the two computing units (e.g., servers) via USB 3.0. At full frame rate, each camera produces about 200 MB/s and four cameras produce 800 MB/s, exceeding the write capacity of most SSD storage. In such embodiments, the computing units can be equipped with M.2 SSD drives which can accommodate the full streaming camera data. Such embodiments in accordance with the present principles can further include at least one optional structured light emitter for illuminating an area with structured light during the capturing of images of a human moving through the area. In some embodiments and as described above, the area can include an area of a stationary radar. In such embodiments, the light emitter 165, 195 must fall in the frequency band of the cameras 110 and can include at least one visible light emitter (e.g., an overhead projector), and an IR illuminator in embodiments including an IR-sensitive camera.

In embodiments of a human skeleton pose estimation system of the present principles, such as the human skeleton pose estimation system 100 of FIG. 1a and/or the human skeleton pose estimation system 100b of FIG. 1b as described above, the cameras 110 can be synchronized to concurrently capture images or, alternatively or in addition, in some embodiments the timestamp information regarding the image capture times of the cameras can be utilized to synchronize the capture data and information of the cameras 110. That is, in the latter embodiments, the images from the cameras 110 need to be time stamped from a coherent source. Such synchronization information and/or timestamp information can be provided to a system, such as a walk-through scanner, for incorporation of the human skeleton pose estimation of the present principles into such systems.

In some embodiments in accordance with the present principles, the cameras, such as the cameras 110 and 110b of FIG. 1a and FIG. 1b, can further include additional detectors or detector capability to, for example, assist in identifying a body of a subject human. For example, in some embodiments the cameras 110, 110b can include the capabilities of a thermal camera or an infrared camera to improve the detection of a human body or body position, for example, through clothing. In addition, the image capture data and information of the cameras can be used to determine additional information of a human, such as gait and visual appearance, which can be used to assist with issues of occlusion of limbs by using the gait and visual appearance data to fill in gaps in data during occlusion.

The following description will be described with reference to the human skeleton pose estimation system 100 of FIG. 1a, however it should be noted that the following description can also apply to the human skeleton pose estimation system 100b of FIG. 1b or any other human skeleton pose estimation system in accordance with the present principles. Each of the cameras 110 of the human skeleton pose estimation system 100 of FIG. 1a captures images of a moving human target moving across an area of a stationary radar from different points of view. In the human skeleton pose estimation system 100 of FIG. 1a the images from each of the cameras 110 are processed by the respective bounding box detection modules 120, in which the rectangular pixel coordinates of the human in the scenes captured by the cameras 110 are extracted.

In some embodiments, the respective bounding box detection modules 120 implement a single shot detector (SSD) method to process incoming images and to identify the pixel locations of a box (e.g., in some embodiments a rectangle) that bounds the subject human in the scene. SSD uses a deep neural network to produce bounding boxes by training the network to provide small adjustments to a discrete set of bounding boxes. The result is fast bounding box detection.

Figure 2:
FIG. 2 depicts pictorial representations of respectively captured images of, for example, two cameras of a human skeleton pose estimation system in accordance with an embodiment of the present principles.

FIG. 2 depicts pictorial representations of respectively captured images of, for example, two cameras of a human skeleton pose estimation system in accordance with an embodiment of the present principles, such as the human skeleton pose estimation system 100 of FIG. 1a. As depicted in FIG. 2, the bounding box can be different for each camera because each camera can capture images from a different view of the subject human. The images from each camera are processed and the respective bounding boxes are extracted. For example, in FIG. 2, the image on the left depicts an image of a man from a front point of view and as such, it can be assumed that a corresponding camera of a human skeleton pose estimation system of the present principles is in front of the man in the image. In FIG. 2, the image on the right depicts an image of a man from a back point of view and, as such, it can be assumed that a corresponding camera of a human skeleton pose estimation system of the present principles is behind the man in the image.

Advantageously, because in accordance with the present principles, images of a subject moving through an area are captured from a plurality of points of view, data or information missing from any of the images taken from any of the points of view can be determined (filled-in) from data or information associated with any of the images captured from the other points of view.

Referring back to FIG. 1a, the originally captured images and the rectangular pixel coordinates from each of the bounding box detection modules 120 are communicated to the respective image-based skeleton extraction modules 130 where an initial skeleton is extracted. In some embodiments, the respective image-based skeleton extraction modules 130 accept as inputs 256×256 pixel images corresponding to a cropped and scaled version of the bounding box sub-image output from the bounding box detection modules 120. In some embodiments, the image-based skeleton extraction modules 130 extract a 2D skeleton based on a stacked hourglass method. The stacked hourglass method comprises a neural network architecture, pretrained on large datasets to output pixel heatmaps for each of sixteen (16) joints of a human body for the images of each of the cameras 110.

Figure 3:
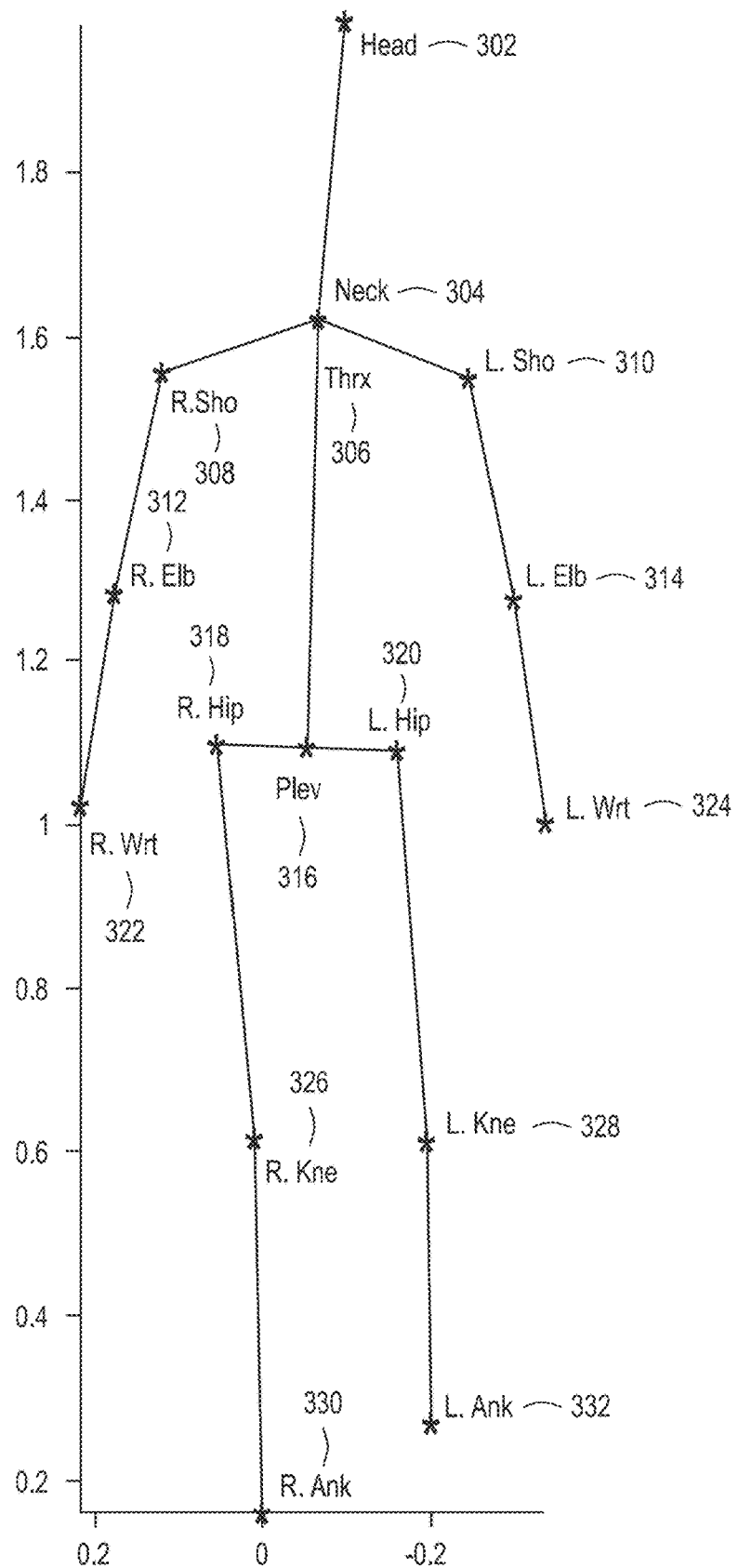
FIG. 3 depicts an example of a stacked hourglass skeleton 300 for an image of a human body determined by an image-based skeleton extraction module of a human skeleton pose estimation system in accordance with an embodiment of the present principles.

For example, FIG. 3 depicts an example of a stacked hourglass skeleton 300 for an image of a human body determined by an image-based skeleton extraction module of a human skeleton pose estimation system in accordance with an embodiment of the present principles. As depicted in FIG. 3, the stacked hourglass skeleton 300 comprises sixteen (16) joints including a head joint 302, a neck joint 304, a thorax joint 306, a right shoulder joint 308, a left shoulder joint 310, a right elbow joint 312, a left elbow joint 314, a pelvis joint 316, a right hip joint 318, a left hip joint 320, a right wrist joint 322, a left wrist joint 324, a right knee joint 326, a left knee joint 328, a right ankle joint 330, and a left ankle joint 332. Although in the embodiment of FIG. 3, sixteen (16) specific joints are depicted, in some embodiments, a resulting skeleton can comprise only some or all of the 16 joints depicted in FIG. 3 and can also depict other joints not shown in FIG. 3.

The architecture of the image-based skeleton extraction modules 130 is referred to as a "stacked hourglass" network based on the successive steps of pooling and up-sampling that are performed to produce a final set of predictions. For example, in some embodiments, the output of each of the image-based skeleton extraction modules 130 comprise sixteen (16) corresponding heatmaps depicting a likelihood that a particular joint is located at the determined location. It is worth nothing that in some embodiments the "stacked hourglass" network of the image-based skeleton extraction modules 130 processes each frame individually and does not perform any temporal fitting.

Figures 4A, 4B:
FIG. 4a depicts an image of a 2D skeleton determined from the maximum of the sixteen (16) heatmaps depicted in FIG. 4b in accordance with an embodiment of the present principles
FIG. 4b depicts an example of heatmaps output by the stacked hourglass network of an image-based skeleton extraction module of a human skeleton pose estimation system for an image of a human captured by a respective camera in accordance with an embodiment of the present principles.

FIG. 4b depicts an example of heatmaps output by the stacked hourglass network of an image-based skeleton extraction module 130 of a human skeleton pose estimation system, such as the human skeleton pose estimation system 100 of FIG. 1, for an image of a human captured by a respective camera 110 in accordance with an embodiment of the present principles. As depicted in FIG. 4b, the maximum of the sixteen (16) heatmaps images are taken to produce a skeleton as depicted in FIG. 4a. That is, FIG. 4a depicts an image of a 2D skeleton determined from the maximum of the sixteen (16) heatmaps depicted in FIG. 4b in accordance with an embodiment of the present principles. As recited above, in accordance with the present principles, in some embodiments, the cameras 110 of the human skeleton pose estimation system 100 of FIG. 1a can comprise 3D cameras and in such embodiments, a single-view 3D skeleton can be extracted from the 3D camera data similarly as described above for the extraction of the initial 2D skeleton.

All eight 2D/3D skeletons from each of the respective image-based skeleton extraction modules 130 are then communicated from each of the image-based skeleton extraction modules 130 to the multi-view fusion module 150, which produces a rough 3D initial guess (e.g., first, multi-view 3D) of the human skeleton. The accuracy of the initial 3D skeleton from the multi-view fusion module 150 is approximately 6 cm.

In some embodiments, the multi-view fusion module 150 implements Singular Value Decomposition (SVD) to extract the first, multi-view 3D skeleton. That is, the multi-view fusion module 150 uses the maximum 2D joint pixel locations and known locations of the cameras 110 to triangulate an initial guess for the 3D joint locations according to equation one (1), which follows:

$$P_i = K_i T_w^i = \begin{bmatrix} q_i \\ r_i \\ t_i \end{bmatrix}, \quad (1)$$

where $P_i$ is the projective matrix of the i-th camera, $K_i$ is the 3×3 intrinsic matrix of the i-th camera, and $T_w^i$ is the 3×4 homogenous transform between the world frame and i-th camera.

Letting $(u_i, v_i)$ be the pixel observation from the i-th camera, A can be constructed according to equation two (2), which follows:

$$A = \begin{bmatrix} u_1 t_1 - q_1 \\ v_1 t_1 - r_1 \\ \vdots \\ u_7 t_7 - q_7 \\ v_7 t_7 - r_7 \end{bmatrix}. \quad (2)$$

If least squares minimization is performed via the multi-view fusion module 150, then $U\Sigma V^T = A$. The best 3D position of the joint, X, corresponds to the smallest eigenvalue of A and the last column of V. This process is then repeated for each joint at every frame in the sequence. The inventors noted that the resulting joint positions are not optimal. In particular, the resulting joint positions assume that the maximum of the heat map is the best joint location in 2D. The first, multi-view 3D skeleton can then be optimized via, what the inventors consider, visibility reasoning techniques. For example, in some embodiments, a nonlinear least squares technique can be applied to the first, multi-view 3D skeleton to optimize the pixel locations and reduces the overall error (described in greater detail below).

The inventors noted that in some embodiments, the multi-view fusion module 150 sometimes confuses left and right joints. For example, a left hip was sometimes labeled as the right hip, and vice-a-versa. This is problematic because the SVD optimization performs least squares and is not tolerant of outliers (so the left right confusion can drastically alter the resulting 3D estimate of the joint position). In some embodiments, to address this issue, a search can be performed during SVD optimization. The algorithm iteratively searches by flipping the left and right associations for a minority of the cameras and performing the SVD optimization. The search can take place for each frame and each joint and completes quickly because the SVD is fast.

Because the multi-view fusion module makes a greedy assumption about the neural network results, the results are suboptimal, although the multi-view fusion module provides a quick initial guess for further optimization and is used to help disambiguate left/right joint confusion.

In some embodiments, the skeleton fitting module 160 performs an optimization to the first, multi-view 3D skeleton identified in these teachings as a visibility reasoning technique. For example, in some embodiments, the he skeleton fitting module 160 is implemented to remove the greedy assumption and jointly optimize the position of each joint while maximizing the likelihood from the neural network detections and keeping the bone lengths fixed. That is, the skeleton fitting module 160 is implemented to jointly optimize the pixel locations and reduce the overall error to around 3 cm. In some embodiments, to minimize the cost but maximize heatmap values, the cost is determined using the negated heatmap values according to equation three (3), which follows:

$$\text{cost} = \sum_{f \in frames} \left( \sum_{c \in cameras} \left( \sum_{j \in joints} neg_{heatmap}(B_w^c X_{f,j}^w) \right) \right) + \sum_{f \in frames} \left( \sum_{(i,j) \in jbones} (b_{ij} - (X_{f,i}^w - X_{f,j}^w)) \right) \quad (3)$$

where $b_{i,j}$ is the bone length from joint i to joint j, $X_{f,j}^w$ is the position of joint j at frame f expressed in the world frame, w, and $B_w^c$ is the matrix that converts world positions into the heatmap of camera c. The skeleton fitting module 160 minimizes the cost by solving for the $X_{f,j}^w$ and $b_{i,j}$ for every frame and joint.

In some embodiments, the first, multi-view 3D skeleton can be optimized using Skinned Multi-Person Linear techniques whether or not the first, multi-view 3D skeleton was optimized by the skeleton fitting module 160. In some embodiments in accordance with the present principles, the optimized 3D skeleton can be further optimized, for example, using another visibility reasoning technique. That is, in some embodiments, the optimized 3D skeleton from the skeleton fitting module 160 can be converted to a Skinned Multi-Person Linear (SMPL) representation at the skeleton conversion module 170. That is, in some embodiments, the skeleton conversion module 170 provides a way to associate "flesh" with a skeletal model by, in some embodiments, using a machine learning approach to produce a linear function mapping from joint angles to mesh vertices.

SMPL is typically defined using at least three (3) types of parameters. A first type of parameter includes a rigid body transform (e.g., six (6) parameters per frame) between the skeleton's origin and the world. In some embodiments, $T_f^w$ represents a rigid body transform for the f-th frame.

In some embodiments, a second type parameter includes shape parameters which define the "characteristics" of a subject human. For example, the shape parameters determine height, weight, etc. Importantly, these shape parameters are learned from training datasets. Together, the shape parameters are designed to describe the full range of human body shapes. Note, however, that no single parameter, for example, corresponds to "height." In some embodiments, β represents the shape parameters.

In some embodiments, a third type parameter includes three (3) orientation angles for each of the 16 skeleton joints (converted from SMPL 23 skeleton joints/69 parameters per frame (see paragraph below)). These angles can be encoded as Rodrigues angles. In some embodiments, $\theta_f$ represents the joint angles at the f-th frame.

As described above, the stacked hourglass network uses sixteen (16) joints with 3D (x,y,z) for each joint (48 parameters per frame). Letting $X_f$ represent the joint positions at the f-th frame, in order to perform the fit between 3D dense stereo data and an SMPL mesh (described in greater detail below), the stacked hourglass $X_f$ joint positions need to be converted into SMPL $\{T_f^w, \beta, \theta_f\}$ parameters. As part of the conversion between the 3D dense stereo data and the SMPL mesh, β, is estimated. The optimization can then be determined according to equation four (4), which follows:

$$\hat{T}_f^w, \hat{\beta}, \hat{\theta}_f = \underset{T_f^w, \beta, \theta_f}{\operatorname{argmin}} \sum_f (smpl(T_f^w, \beta, \theta_f) - X_f)^2, \quad (4)$$

where smpl( . . . ) converts the SMPL representation to joint positions as similarly described above with respect to the stacked hourglass network. One advantage of the SMPL representation is its linearity which enables the efficient computation of the derivatives.

Figure 5:
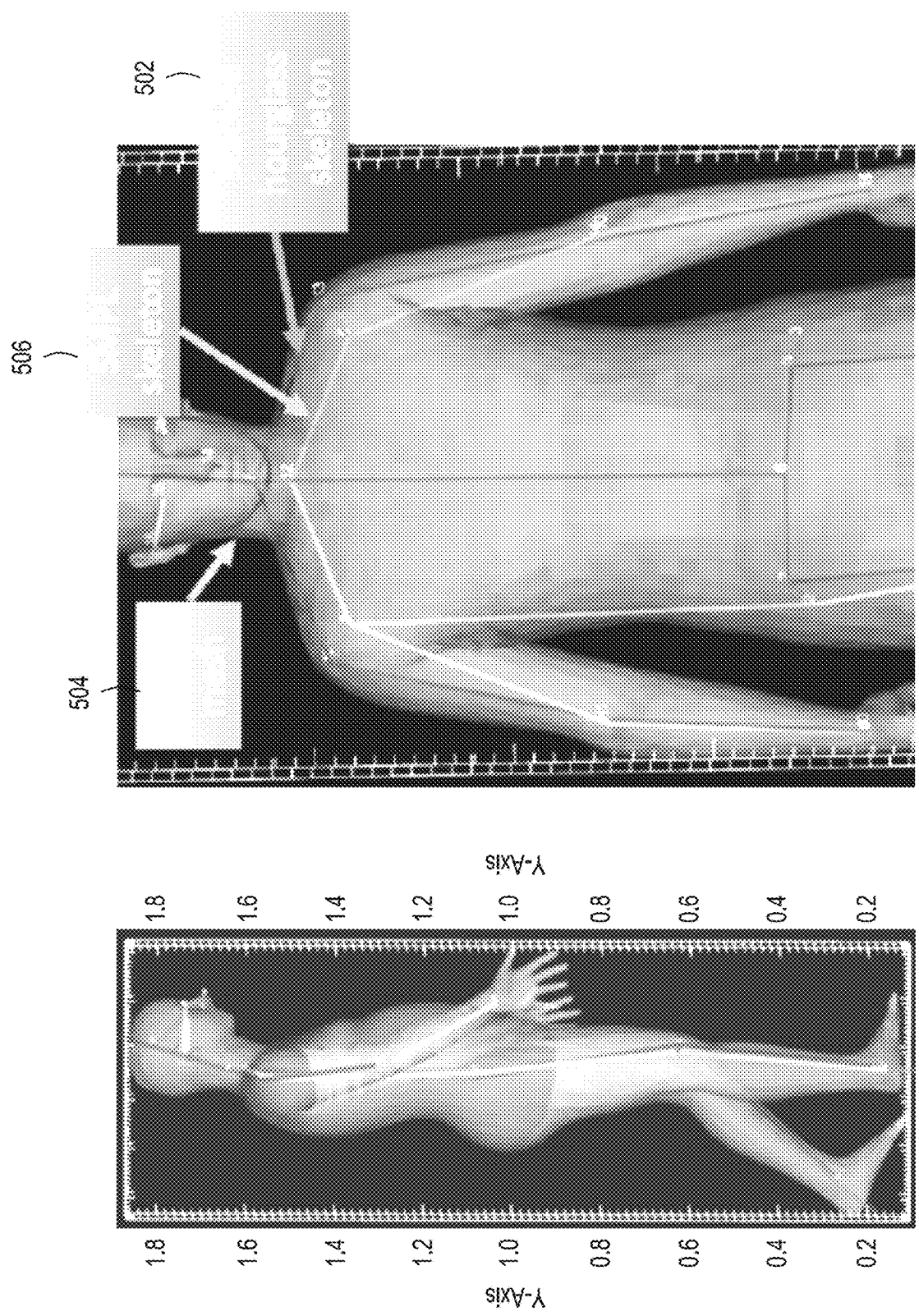
FIG. 5 depicts a graphical representation of an SMPL mesh and an SMPL skeleton determined for a stacked hourglass skeleton in accordance with an embodiment of the present principles.

FIG. 5 depicts a graphical representation of an SMPL mesh 504 and an SMPL skeleton 506 determined for a stacked hourglass skeleton 502 as described above and in accordance with an embodiment of the present principles. The process of FIG. 5 is commonly referred to as "skinning". That is, in the embodiment of FIG. 5, an SMPL model mesh 504 is rigged to an SMPL skeleton 506, which is converted from the stacked hourglass skeleton 502 to the SMPL skeleton 502 using an optimization process as described herein.

The SMPL mesh (i.e., fleshy skeleton) from the skeleton conversion module 170 can be further refined against 3D point cloud data from the dense stereo module 140 in the 3D model fit module 180. That is, in some embodiments, to further improve the results, the SMPL mesh model output from skeleton conversion module 170 is aligned against the 3D point cloud generated from the stereo data of the dense stereo module 140 in the 3D model fit module 180.

Figure 6:
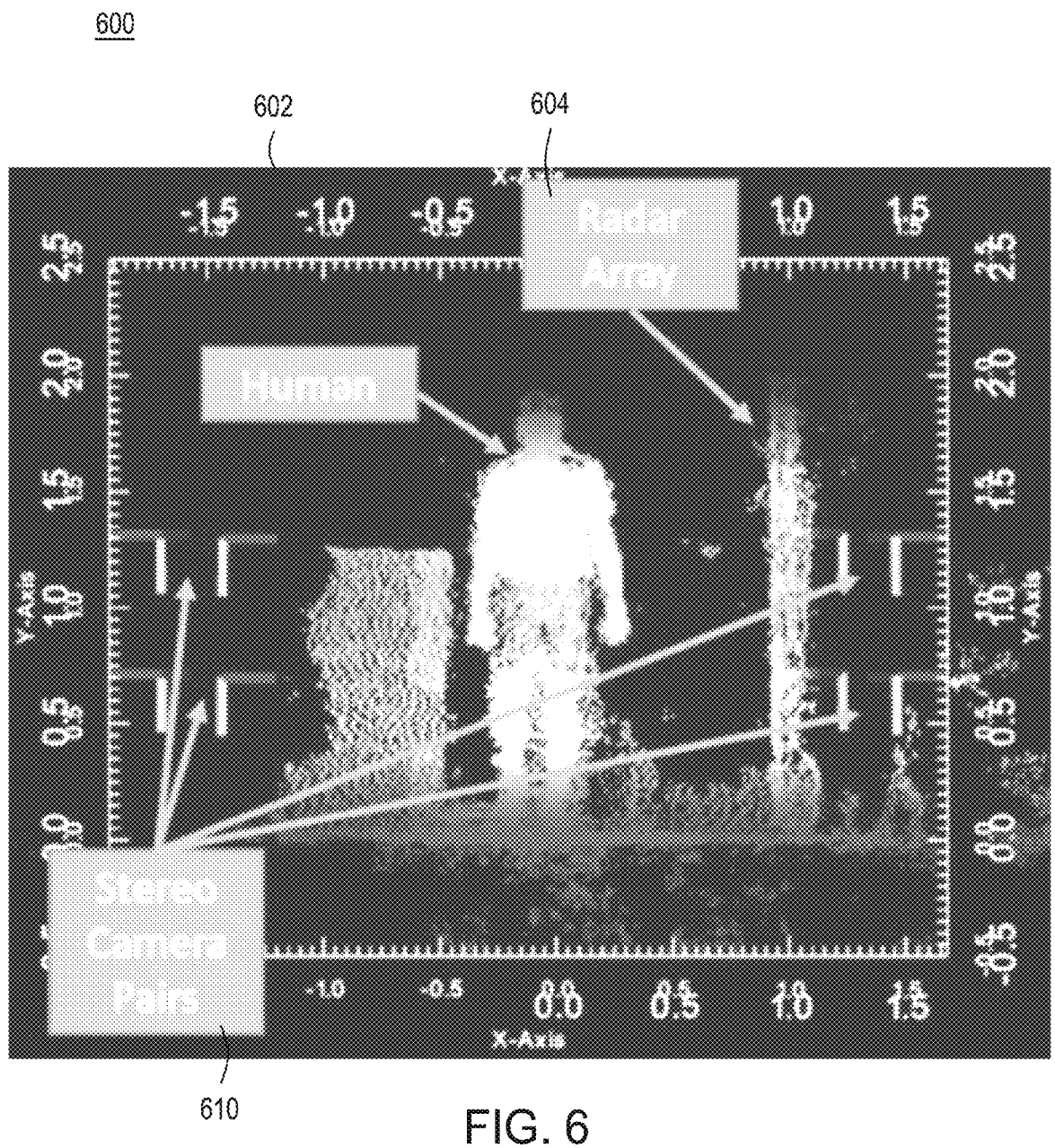
FIG. 6 depicts an example 3D point cloud generated from four camera pairs of a human skeleton pose estimation system in accordance with an embodiment of the present principles.

FIG. 6 depicts an example 3D point cloud 600 generated from four stereo pairs, for example, the four camera 110 pairs of the human skeleton pose estimation system 100 of FIG. 1a in accordance with an embodiment of the present principles. As depicted in FIG. 6, the subject human 602 and the radar array 604 are clearly visible. In the 3D point cloud 600 of FIG. 6, the stereo data is color-coded (shaded) by height. The dense stereo data depicted in FIG. 6 is produced by finding visual features common to the two cameras 110 in the pair and then triangulating the visual features to find their 3D position. The points from all four camera pairs 110 are merged into a single point cloud.

The SMPL optimization proceeds in the 3D model fit module 180 by finding the nearest mesh vertex from every point in the dense stereo point cloud. As an initial estimation, the output from the skeleton conversion module 170 is used (based on the stacked hourglass model). The initial estimation is critical, as successful optimization requires a good initial estimate. The optimization then proceeds by adjusting the rigid body transform at the f-th frame and the joint angles at the f-th frame $\{T_f^w, \theta_f\}$ until the error between the stereo points and the mesh is minimized. The shape parameters $\beta$ are fixed as the shape parameters were previously optimized as described above and it is not expected that the height/weight/etc. of the subject human to change significantly between the SMPL and stacked hourglass models.

In some embodiments SMPL optimization proceeds in the 3D model fit module 180 by applying temporal smoothing. That is, in some embodiments, an 11-frame hamming window filter can be applied to the joint angles at the f-th frame, $\theta_f$, to smooth the results. In some embodiments, a frame rate can be chosen to be high (90 Hz) relative to human motion, so that averaging can be used to lower the noise level. Importantly, the smoothing is performed in the joint angle space of the SMPL model so that the smoothing can be done without affecting the bone length. If the smoothing was performed in the stacked hourglass position space, the smoothing would have the undesirable side effect of changing the bone lengths. The optimization reduces the average error to approximately 1 cm. The output of the 3D model fit module 180 is the 3D position of each joint in the skeleton, which can then be provided for radar reconstruction.

The inventors determined that structured light can improve the pose estimation of a human body in accordance with the present principles by increasing the number of data points on a point cloud by providing visual features on otherwise texture-less surfaces. For example, FIG. 7a depicts an input image 702, a disparity image 704, and a reconstructed point cloud 706 of an image of a human illuminated by non-structured light and captured by a camera of, for example, a human skeleton pose estimation system of the present principles. As depicted in FIG. 7a, the disparity image 704 and the reconstructed point cloud 706 do not comprise dense data coverage.

Figure 7B:
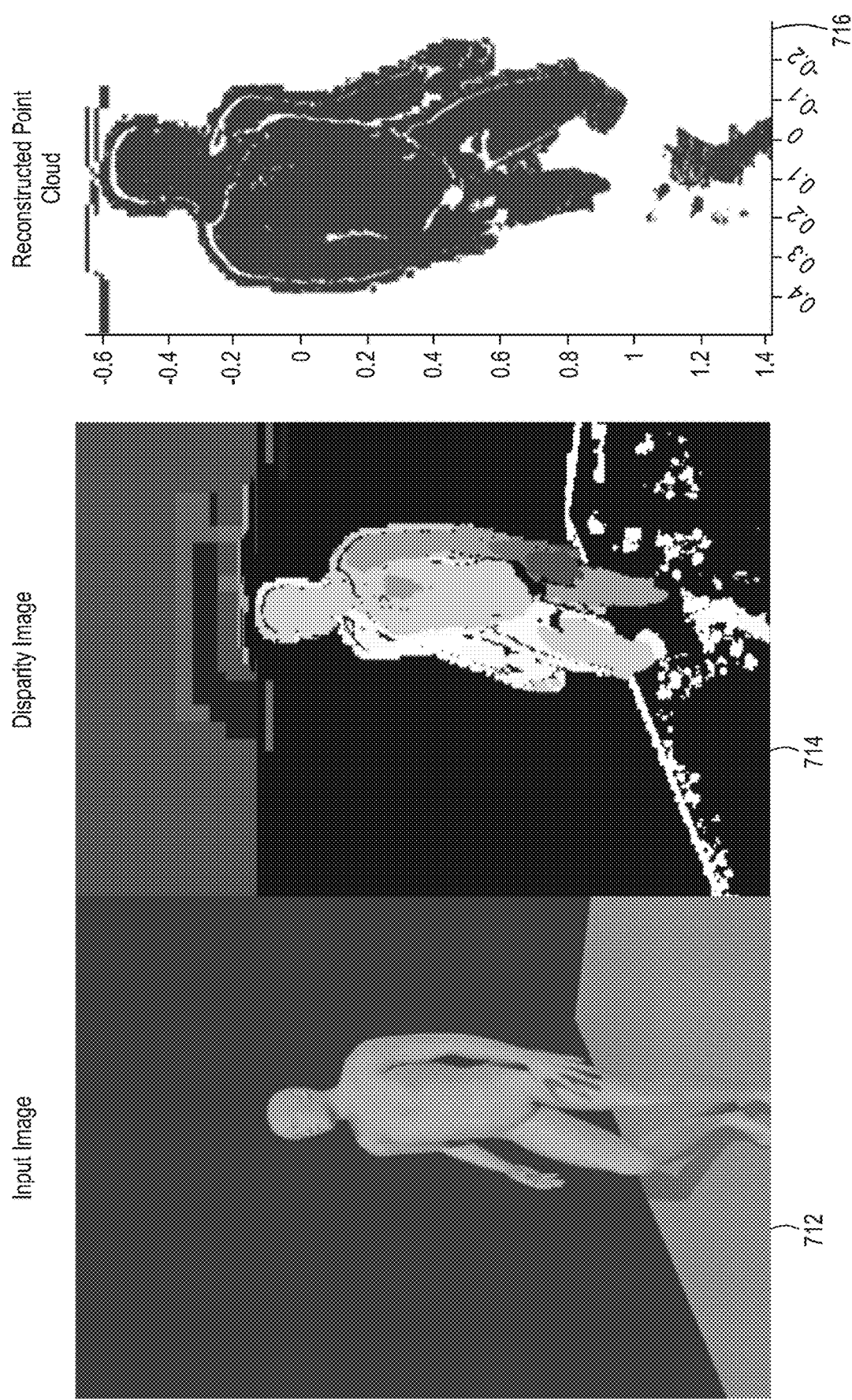
FIG. 7b depicts an input image, a disparity image, and a reconstructed point cloud of an image of a human illuminated by structured light captured by a camera of a human skeleton pose estimation system in accordance with an embodiment of the present principles.

FIG. 7b depicts an input image 712, a disparity image 714, and a reconstructed point cloud 716 of an image of a human illuminated by structured light, such as from the structured light emitter 165 of FIG. 1a and the structured light emitters 195 of FIG. 1b, and captured by a camera of, for example, a human skeleton pose estimation system of the present principles. As depicted in FIG. 7b, the disparity image 714 and the reconstructed point cloud 716 possess much denser data coverage when a subject is illuminated by structured light. That is, structured light provides texture on the scene improving the quality of dense stereo reconstruction. As shown in a comparison between FIG. 7a and FIG. 7b, the structured light pattern helps to fill the "holes" in the center of the image of the human (e.g., in the center of the torso). To reduce any errors in calculations of the bounding box detection modules 10 and the image-based skeleton extraction modules 130 caused by structured light patterns which are not present in the training data of such modules, the inventors experimented with different structured light patterns.

FIG. 8 depicts a table listing of different structured light patterns that can be used to illuminate a human subject when capturing images using a camera of a human skeleton pose estimation system in accordance with an embodiment of the present principles. As depicted in FIG. 8, large black circles increased a skeleton error by 2.9%, large white circles increased a skeleton error by 16.8%, black rings increased a skeleton error by 11.8%, white rings increased a skeleton error by 0.7%, small black rings increased a skeleton error by 3.9%, and small white rings increased a skeleton error by 27.6%. As such, in some embodiments, the inventors chose to implement the "white rings" structured light pattern because it had minimal effect on the performance (only a 0.7% increase in error) and provided the needed additional texture to captured images.

In one experiment, to quantify the performance of determined skeletal poses of a human skeleton pose estimation system in accordance with the present principles, the inventors compared the determined skeletal poses against a "ground truth" oracle system. An 8-camera OptiTrack7 camera system, which is advertised to provide millimeter-accurate pose estimates of small reflective markers was used. The OptiTrack software, Motive 2.0, tracks small markers and can estimate a subject person's skeleton. The OptiTrack skeleton output is an industry standard BVH file, which describes the pose of the skeleton at 180 Hz. The cameras of the human skeleton pose estimation system of the present principles were synchronized to the OptiTrack clock and the performance of the human skeleton pose estimation system (which does not use the reflective markers) was directly compared to the ground truth OptiTrack system.

Figure 9:
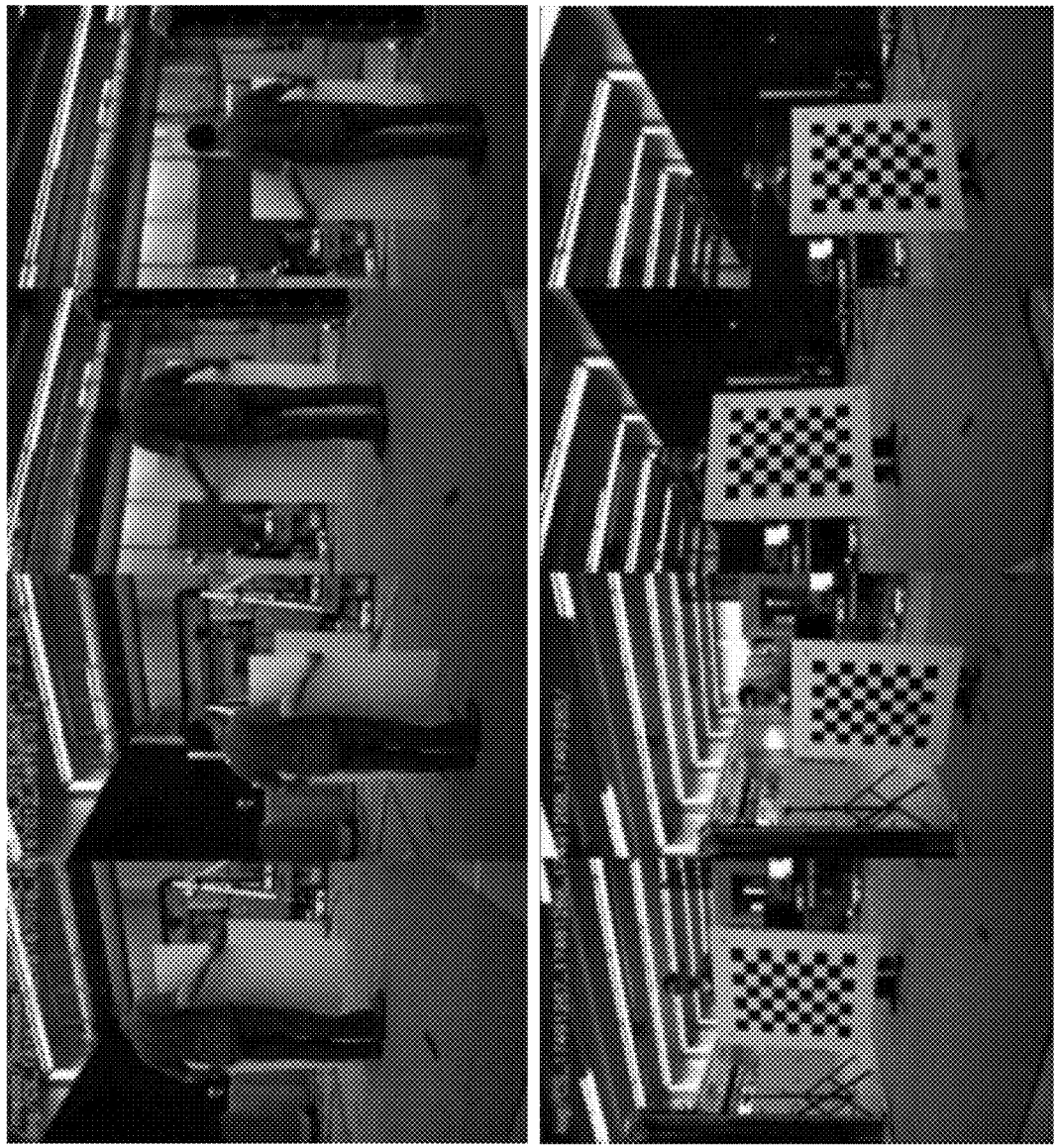
FIG. 9 depicts images from eight (8) cameras of a human skeleton pose estimation system of the present principles capturing images of a 1 meter checkerboard from the respective poses of the eight (8) cameras in accordance with an embodiment of the present principles.

To compare the skeleton estimates of the human skeleton pose estimation system of the present principles with the ground truth estimates of the OptiTrack system, the poses of the cameras in the OptiTrack reference frame were required. To recover the poses of the cameras in the OptiTrack reference frame, the system was "calibrated" using an approximately 1 meter checkerboard. For example, FIG. 9 depicts images from eight (8) cameras of a human skeleton pose estimation system of the present principles capturing images of the 1 meter checkerboard from the respective poses of the eight (8) cameras in accordance with an embodiment of the present principles. The checkerboard of FIG. 9 comprises OptiTrack reflective markers attached in the corners. As such, at every frame, the location of the markers in the OptiTrack frame are known and the pixel coordinates of the checkerboard corners can be extracted. Each of the pixel locations defines a ray from the camera's origin through the point of the reflective markers, and because the checkerboard is visible in multiple cameras, the 3D location of the checkerboard corner must lie at the intersection of these rays. As such, the camera-to-OptiTrack and camera-to-checkerboard poses were recovered via optimization by collecting many (>1000) images.

The pose estimation of a human skeleton pose estimation system in accordance with the present principles, such as the human skeleton pose estimation system 100 of FIG. 1, was tested with a variety of structured light patterns, projector positions, and two human test subjects. FIG. 10 depicts a table 1000 of the test results of human pose estimations for the sixteen (16) joints of the bodies of each of the two human subjects illuminated by different structured light patterns and captured by a human skeleton pose estimation system in accordance with an embodiment of the present principles. That is, in the table 1000 of FIG. 10, an error is measured per joint (listed in rows) and the different testing conditions are listed along the columns of the table 1000. At the bottom of the table 1000, the mean error is summarized for the lower region of the body of the human subject, the upper region of the body of the human subject, and for the whole body of the human subject. With reference to the table 1000 of FIG. 10, several conclusions can be drawn:

(1) The hs7_003 and hs7_004 (first two left-most columns) achieved the best overall results with a whole body RMSE of 0.0133 m and 0.0114 m, respectively. The hs7_003 and hs7_004 tests used a determined best structured light pattern (white rings) and a determined best structured light projector placement.

(2) RMS error across all the test conditions was 1-2 cm, although structured light did improve the results (note hs7_001 and hs6_015 with no structured light exhibited the worst performance).

(3) For all cases, the Upper Body was tracked better than the Lower Body. Without exception, the Lower Body RMSE is larger than the Upper Body RMSE. In the best case (hs7_003), the RMSE for the Upper Body was 7.8 mm. The result can be due to interference from the floor and background objects increasing the noise near the ground.

Figure 11:
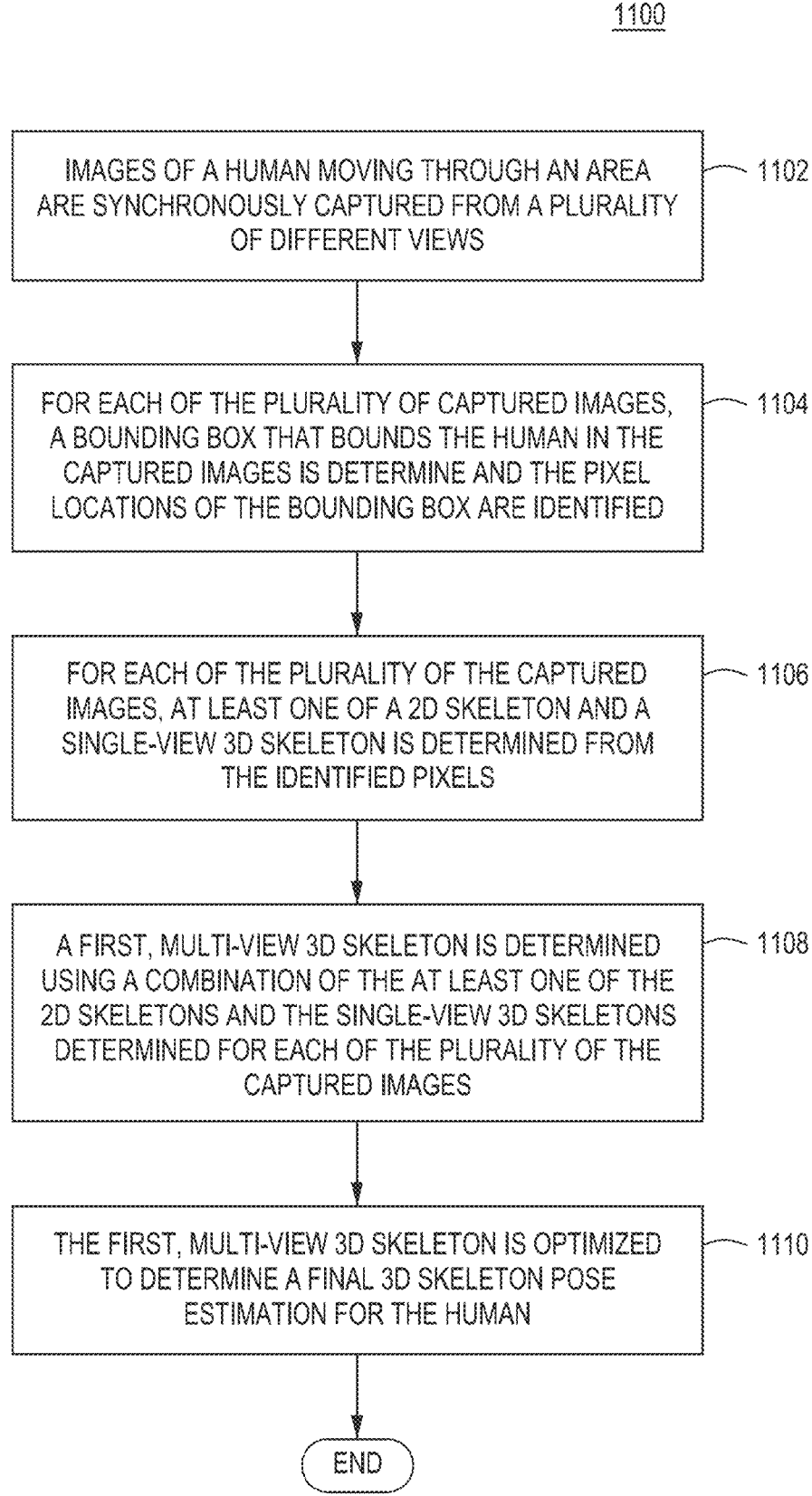
FIG. 11 depicts a flow diagram of a method for human pose estimation in accordance with an embodiment of the present principles.

FIG. 11 depicts a flow diagram of a method 1100 for a human skeleton pose estimation in accordance with an embodiment of the present principles. The method 1100 begins at 1102 during which images of a human moving through an area, for example an area of a stationary radar, are synchronously captured from a plurality of different points of view. For example and as described above, in some embodiments, each of eight synchronized cameras of a human skeleton pose estimation system of the present principles capture images of a moving human target moving across an area from different points of view. The method can continue to 1104.

At 1104, for each of the plurality of captured images, a bounding box that bounds the human in the captured images is determine and the pixel locations of the bounding box are identified. For example and as described above, in some embodiments the respective bounding box detection modules implement a single shot detector (SSD) method to process incoming images and to identify the pixel locations of a box (e.g., in some embodiments a rectangle) that bounds the subject human in the scene. SSD uses a deep neural network to produce bounding boxes by training the network to provide small adjustments to a discrete set of bounding boxes. The method 1100 can proceed to 1106.

At 1106, for each of the plurality of the captured images, at least one of a 2D skeleton and a single-view 3D skeleton is determined from the identified pixels. For example and as described above, in some embodiments, the respective image-based skeleton extraction modules accept as inputs 256×256 pixel images corresponding to a cropped and scaled version of the bounding box sub-image output from the bounding box detection modules. In some embodiments, the image-based skeleton extraction modules extract a 2D skeleton based on a stacked hourglass method, which comprises a neural network architecture, pretrained on large datasets to output pixel heatmaps for each of sixteen (16) joints of a human body for the images of each of the cameras. The method 1100 can proceed to 1108.

At 1108, a first, multi-view 3D skeleton is determined using a combination of the at least one of the 2D skeletons and the single-view 3D skeletons determined for each of the plurality of the captured images. For example and as described above, in some embodiments a rough 3D initial guess of the human skeleton is determined from the maximum 2D joint pixel locations and known locations of the cameras to triangulate an initial guess for the 3D joint locations. The method 1100 can proceed to 1110.

At 1110, the first, multi-view 3D skeleton is optimized to determine a final 3D skeleton pose estimation for the human by, in some embodiments, applying visibility reasoning techniques to at least some of the 2D skeletons and the single-view 3D skeletons determined for the plurality of captured images. For example and as described above, in some embodiments to optimize the first 3D skeleton a skeleton fitting module jointly optimizes the position of each joint of the determined first, multi-view 3D skeleton while maximizing a likelihood from the neural network detections and keeping the bone lengths of the skeleton fixed. Alternatively or in addition, to optimize the first, multi-view 3D skeleton, a skeleton conversion module provides a way to associate "flesh" with a skeletal model by, in some embodiments, using a machine learning approach to produce a linear function mapping from joint angles to mesh vertices. The skeleton conversion module determines an SMPL mesh and an SMPL skeleton for optimizing the first, multi-view 3D skeleton. Furthermore, alternatively or in addition, in some embodiments to further optimize the first, multi-view 3D skeleton, the SMPL mesh model output from the skeleton conversion module is aligned against the 3D point cloud generated from the stereo data of a dense stereo module in a 3D model fit module. The method 1100 can be exited.

In some embodiments, the method 1100 can further include illuminating the area of the stationary radar with structured light during the capturing of the images of the human moving through the area.

Figure 12:
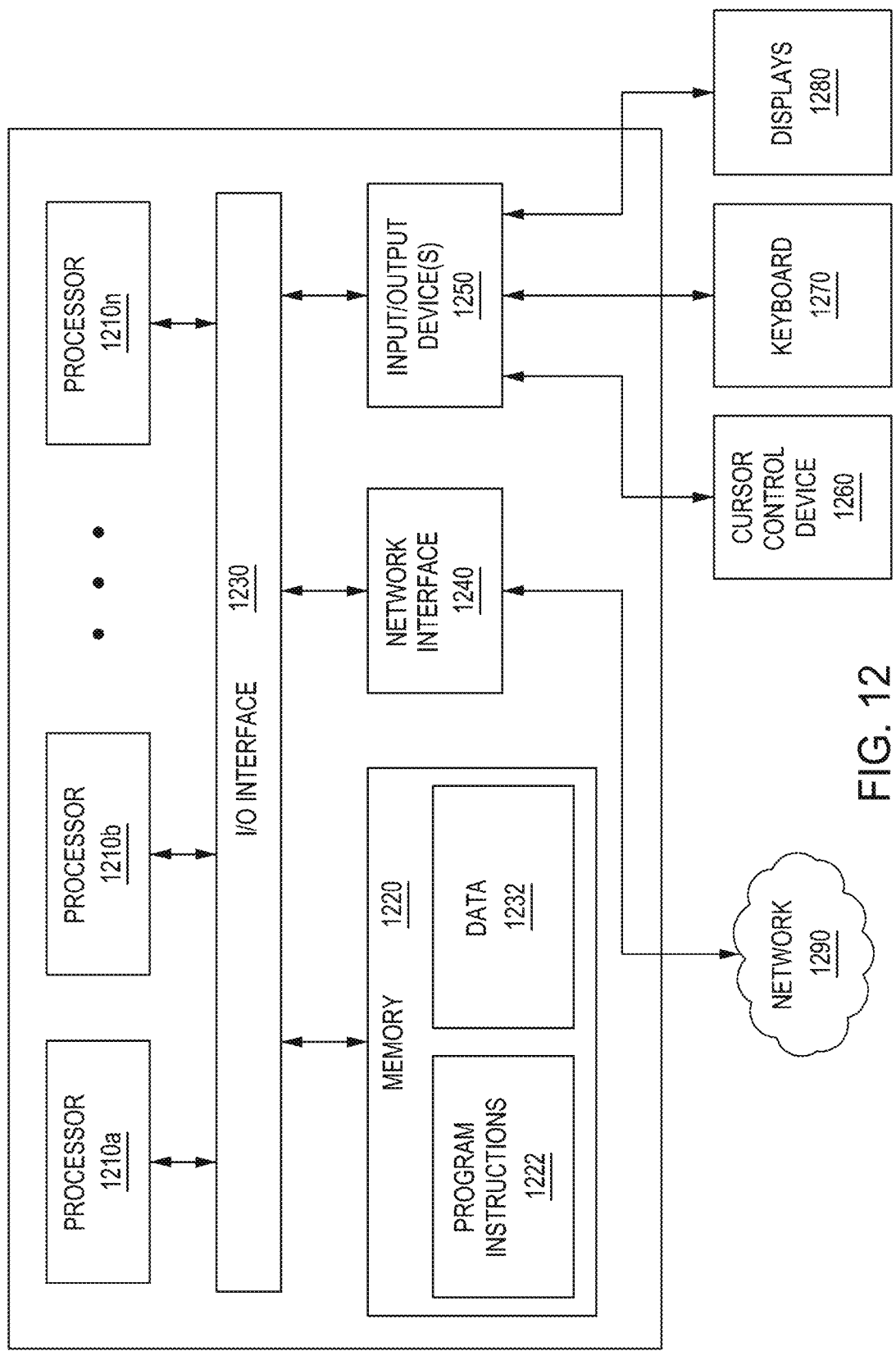
FIG. 12 depicts a high-level block diagram of a computing device suitable for use with embodiments of a human pose estimation system in accordance with embodiments of the present principles.

FIG. 12 depicts a high-level block diagram of a computing device 1200 suitable for use with embodiments of a human skeleton pose estimation system in accordance with the present principles such as the human skeleton pose estimation system 100b of FIG. 1b. In some embodiments, the computing device 1200 can be configured to implement methods of the present principles, such as at least the method 1100 of FIG. 11 as processor-executable executable program instructions 1222 (e.g., program instructions executable by processor(s) 1210) in various embodiments.

In the embodiment of FIG. 12, the computing device 1200 includes one or more processors 1210a-1210n coupled to a system memory 1220 via an input/output (I/O) interface 1230. The computing device 1200 further includes a network interface 1240 coupled to I/O interface 1230, and one or more input/output devices 1250, such as cursor control device 1260, keyboard 1270, and display(s) 1280. In various embodiments, a user interface can be generated and displayed on display 1280. In some cases, it is contemplated that embodiments can be implemented using a single instance of computing device 1200, while in other embodiments multiple such systems, or multiple nodes making up the computing device 1200, can be configured to host different portions or instances of various embodiments. For example, in one embodiment some elements can be implemented via one or more nodes of the computing device 1200 that are distinct from those nodes implementing other elements. In another example, multiple nodes may implement the computing device 1200 in a distributed manner.

In different embodiments, the computing device 1200 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1200 can be a uniprocessor system including one processor 1210, or a multiprocessor system including several processors 1210 (e.g., two, four, eight, or another suitable number). Processors 1210 can be any suitable processor capable of executing instructions. For example, in various embodiments processors 1210 may be general-purpose or embedded processors implementing any of a variety of instruction set architectures (ISAs). In multiprocessor systems, each of processors 1210 may commonly, but not necessarily, implement the same ISA.

System memory 1220 can be configured to store program instructions 1222 and/or data 1232 accessible by processor 1210. In various embodiments, system memory 1220 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1220. In other embodiments, program instructions and/or data can be received, sent or stored upon different types of computer-accessible media or on similar media separate from system memory 1220 or computing device 1200.

In one embodiment, I/O interface 1230 can be configured to coordinate I/O traffic between processor 1210, system memory 1220, and any peripheral devices in the device, including network interface 1240 or other peripheral interfaces, such as input/output devices 1250. In some embodiments, I/O interface 1230 can perform any necessary protocol, timing or other data transformations to convert data signals from one component (e.g., system memory 1220) into a format suitable for use by another component (e.g., processor 1210). In some embodiments, I/O interface 1230 can include support for devices attached through various types of peripheral buses, such as a variant of the Peripheral Component Interconnect (PCI) bus standard or the Universal Serial Bus (USB) standard, for example. In some embodiments, the function of I/O interface 1230 can be split into two or more separate components, such as a north bridge and a south bridge, for example. Also, in some embodiments some or all of the functionality of I/O interface 1230, such as an interface to system memory 1220, can be incorporated directly into processor 1210.

Network interface 1240 can be configured to allow data to be exchanged between the computing device 1200 and other devices attached to a network (e.g., network 1290), such as one or more external systems or between nodes of the computing device 1200. In various embodiments, network 1290 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1250 can, in some embodiments, include one or more display terminals, keyboards, keypads, touchpads, scanning devices, voice or optical recognition devices, or any other devices suitable for entering or accessing data by one or more computer systems. Multiple input/output devices 1250 can be present in computer system or can be distributed on various nodes of the computing device 1200. In some embodiments, similar input/output devices can be separate from the computing device 1200 and can interact with one or more nodes of the computing device 1200 through a wired or wireless connection, such as over network interface 1240.

In some embodiments, the illustrated computing device 1200 can implement any of the operations and methods described above, such as the method 1100 illustrated by the flowchart of FIG. 11. In other embodiments, different elements and data can be included.

Those skilled in the art will appreciate that the computing device 1200 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1200 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1200 can be transmitted to the computing device 1200 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 13:
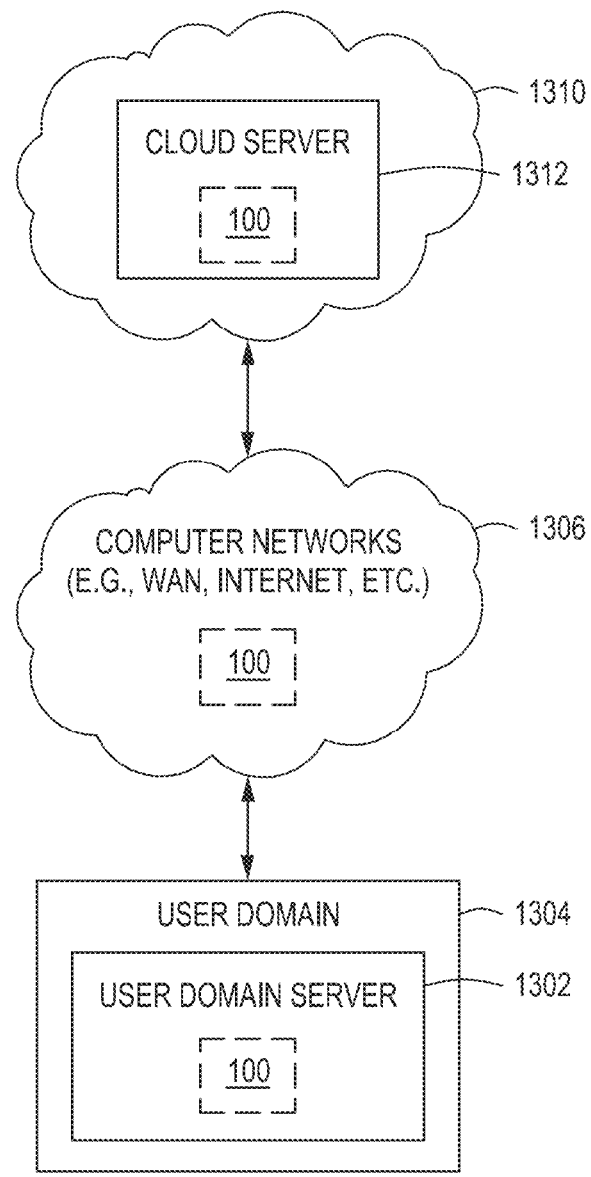
FIG. 13 depicts a high-level block diagram of a network in which embodiments of a human pose estimation system in accordance with the present principles can be implemented.

FIG. 13 depicts a high-level block diagram of a network in which embodiments of a human skeleton pose estimation system in accordance with the present principles can be implemented. The network environment 1300 of FIG. 13 illustratively comprises a user domain 1302 including a user domain server 1304. The network environment 1300 of FIG. 13 further comprises computer networks 1306, and a cloud environment 1310 including a cloud server 1312.

In the network environment 1300 of FIG. 13, a human skeleton pose estimation system in accordance with the present principles, such as the human skeleton pose estimation system 100 of FIG. 1a and the human skeleton pose estimation system 100b of FIG. 1b, can be included in at least one of the user domain server 1304, the computer networks 1306 and the cloud server 1312. That is, in some embodiments, a user can use a local server (e.g., the user domain server 1304) to provide the functionality of a human skeleton pose estimation system in accordance with the present principles.

In some embodiments and as described above, a user can implement a human skeleton pose estimation system in the computer networks 1306 to provide an estimated human skeleton pose in accordance with the present principles. Alternatively or in addition, in some embodiments, a user can implement a human skeleton pose estimation system in the cloud server 1312 of the cloud environment 1310 to provide an estimated human skeleton pose in accordance with the present principles. For example, in some embodiments it can be advantageous to perform processing functions of the present principles in the cloud environment 1310 to take advantage of the processing capabilities of the cloud environment 1310. In some embodiments in accordance with the present principles, a human skeleton pose estimation system can be located in a single or in multiple locations/servers/computers to perform all or portions of the herein described functionalities of a human skeleton pose estimation system in accordance with the present principles.

Embodiments of human pose estimation methods, apparatuses and systems in accordance with the present principles can be used for many applications above and beyond a walk-through scanner system described above. For example, embodiments in accordance with the present principles can be used in a virtual reality (VR) environment. In such applications, embodiments of the present principles can be used to capture a position of a skeleton of a subject to enable a VR avatar to be controlled accurately in the virtual world. Embodiments of the present principles enable a user of the VR equipment to participate in multi-participant interactions (e.g., games, meetings, conferences, consults, etc.) and have the movements of the user accurately tracked without the need for the user to wear any specialized gear.

Embodiments of human pose estimation methods, apparatuses and systems in accordance with the present principles can further be used for medical applications. For example, currently in medical imaging, such as CT scans and MRI scans, a patient's body has to be stabilized to enable the image reconstruction process. That is, currently, during such imaging, the data must be accumulated and aligned over time requiring that the body, limbs, etc. be stationary; otherwise, blurring can occur in the image reconstruction. However, embodiments of the present principles can be implemented to determine a motion of the body being imaged and once the motion of the body, limbs, etc. is known, then the blurring can be eliminated without requiring the patient's body to be stationary.

Embodiments of human pose estimation methods, apparatuses and systems in accordance with the present principles can further be used in sporting and therapeutic applications. For example, in some sporting application, the ability to accurately track the position of the body, limbs, etc. without wearing any special equipment as provided by embodiments of the present principles, can be applied for tracking, for example, a user's tennis or golf swing, which could be quantified and tracked over time. In therapeutic applications, skeletal movements (e.g., range of motion) of patients undergoing physical therapy could be quantified and tracked over time.

Many more applications can take advantage of a human pose estimation in accordance with the present principles.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for human skeleton pose estimation, comprising:
synchronously capturing images of a human moving through an area from a plurality of different points of view;
for each of the plurality of captured images, determining a bounding box that bounds the human in the captured image and identifying pixel locations of the bounding box in the image;
for each of the plurality of captured images, determining at least one of a 2D skeleton and a single-view 3D skeleton from the identified pixel locations of the bounding box;
determining a first, multi-view 3D skeleton using a combination of the at least one of the 2D skeleton and the single view 3D skeleton determined for each of the plurality of captured images; and
optimizing the first, multi-view 3D skeleton to determine a final 3D skeleton pose estimation for the human by applying visibility reasoning techniques to at least some of the 2D skeletons and the single-view 3D skeletons determined for the plurality of captured images.

2. The method of claim 1, comprising:
capturing the images of the human moving through the area during an illumination of the area with structured light to enable the capture of additional texture in the images.

3. The method of claim 1, wherein the area comprises an area of a stationary radar.

4. The method of claim 1, comprising:
determining a gait of the human moving through the area; and
using the gait information to fill-in missing data of occluded portions of the human in the captured images.

5. The method of claim 1, comprising:
using at least one of information and data from the plurality of images captured from the different points of view to fill-in information or data missing for any one of the images captured from the different points of view.

6. The method of claim 1, wherein joint locations for the first, multi-view 3D skeleton are determined from maximum pixel locations of joints of the 2D skeletons and the single-view 3D skeletons and known locations of image capture devices at the different points of view.

7. The method of claim 1, wherein the first, multi-view 3D skeleton is optimized by optimizing a position of each joint of the first, multi-view 3D skeleton by maximizing a likelihood from neural network detections used to determine the at least one of the 2D skeletons and the single-view 3D skeletons and keeping bone lengths of the first, multi-view 3D skeleton fixed.

8. The method of claim 1, comprising:
capturing at least some of the images from the plurality of different points of view as stereo image pairs;
generating a 3D point cloud from data related to the stereo image pairs; and
optimizing the first, multi-view 3D skeleton by aligning at least one of a determined skinned multi-person linear mesh and a determined skinned multi-person linear skeleton against the 3D point cloud.

9. The method of claim 1, comprising:
determining the first, multi-view 3D skeleton using singular value decomposition and flipping left and right associations for a minority of the plurality of captured images when performing the singular value decomposition to determine the first, multi-view 3D skeleton.

10. The method of claim 1, comprising:
capturing at least one of thermal images and infrared images of the human to assist in determining a human skeleton through clothing.

11. An apparatus for human skeleton pose estimation, comprising:
a bounding box detection module to, for each of a plurality of images of a human moving through an area synchronously captured from a plurality of different points of view, determine a bounding box that bounds the human in the captured image and identify pixel locations of the bounding box in the image;
an image-based skeleton extraction module to, for each of the plurality of captured images, determine at least one of a 2D skeleton and a single-view 3D skeleton from the identified pixel locations of the bounding box;
a multi-view fusion module to determine a first, multi-view 3D skeleton using a combination of the at least one of the 2D skeletons and the single-view 3D skeletons determined for each of the plurality of the captured images; and
at least one of a skeleton fitting module and a skeleton conversion module to optimize the first, multi-view 3D skeleton to determine a final 3D skeleton pose estimation for the human by applying visibility reasoning techniques to at least some of the 2D skeletons and the single-view 3D skeletons determined for the plurality of captured images.

12. The apparatus of claim 11, comprising at least one structured light emitter to illuminate the area with structured light during the capture of the images of the human moving through the area to provide visual features in the plurality of captured images for otherwise texture-less surfaces.

13. The apparatus of claim 11, wherein the skeleton conversion module generates at least one of a skinned multi-person linear mesh and a skinned multi-person linear skeleton for optimizing the first, multi-view 3D skeleton.

14. The apparatus of claim 13, further comprising:
an image-based dense stereo module to generate a 3D point cloud from stereo data of the plurality of captured images; and a 3D model fit module to optimize the first, multi-view 3D skeleton by aligning the at least one of the skinned multi-person linear mesh and the skinned multi-person linear skeleton against the 3D point cloud.

15. A system for human skeleton pose estimation, comprising:
   a plurality of cameras to synchronously capture images of a human moving through an area from a plurality of different points of view; and
   an apparatus, comprising;
      a processor; and
      a memory coupled to the processor, the memory having stored therein at least one of programs or instructions executable by the processor to configure the system to:
         synchronously capture images of a human moving through an area from a plurality of different points of view;
         for each of the plurality of captured images, determine a bounding box that bounds the human in the captured image and identify pixel locations of the bounding box in the image;
         for each of the plurality of captured images, determine at least one of a 2D skeleton and a single-view 3D skeleton from the identified pixel locations of the bounding box;
         determine a first, multi-view 3D skeleton using a combination of the at least one of the 2D skeleton and the single view 3D skeleton determined for each of the plurality of captured images; and
         optimize the first, multi-view 3D skeleton to determine a final 3D skeleton pose estimation for the human by applying visibility reasoning techniques to at least some of the 2D skeletons and the single-view 3D skeletons determined for the plurality of captured images.

16. The system of claim 15, comprising:
   at least one structured light emitter; and
   wherein the system is further configured to illuminate the area with structured light during the capturing of the images of the human moving through the area.

17. The system of claim 15, wherein the plurality of different points of view comprise at least two points of view and the area comprises an area of a stationary radar.

18. The system of claim 15, wherein the plurality of images captured from different points of view are time-stamped.

19. The system of claim 15, wherein at least one of the plurality of cameras comprises at least one of thermal and infrared capture capabilities.

20. The system of claim 15, wherein the system is configured to optimize the first, multi-view 3D skeleton by at least one of:
   a) optimizing a position of each joint of the first, multi-view 3D skeleton by maximizing a likelihood from neural network detections used to determine the at least one of the 2D skeletons and the single-view 3D skeletons and keeping bone lengths of the first, multi-view 3D skeleton fixed;
   b) using a machine learning approach to produce a linear function mapping from angles of joints of a determined human skeleton to mesh vertices determined by the skeleton conversion module; and
   c) aligning the mesh vertices against a 3D point cloud generated by an image-based dense stereo module from data from image pairs captured by the plurality of cameras.

* * * * *